(12) United States Patent
Ishimoto et al.

(10) Patent No.: US 7,347,046 B2
(45) Date of Patent: Mar. 25, 2008

(54) LAYOUT OF CATALYST OF VEHICLE

(75) Inventors: Mikio Ishimoto, Shizuoka (JP); Kazuhiko Izumi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/139,197

(22) Filed: May 27, 2005

(65) Prior Publication Data

US 2006/0266024 A1  Nov. 30, 2006

(51) Int. Cl.
  *F02B 27/02*  (2006.01)
(52) U.S. Cl. .......................... 60/312; 60/322
(58) Field of Classification Search ................ 60/299, 60/311, 312, 322; 181/145, 232, 257, 258, 181/264
  See application file for complete search history.

(56) References Cited

U.S. PATENT DOCUMENTS

| | | | | | |
|---|---|---|---|---|---|
| 3,445,196 | A | * | 5/1969 | Thomas | 422/171 |
| 4,004,649 | A | * | 1/1977 | Shimada | 181/266 |
| 5,016,438 | A | * | 5/1991 | Harris | 60/299 |
| 5,043,147 | A | * | 8/1991 | Knight | 60/299 |
| 5,828,013 | A | * | 10/1998 | Wagner et al. | 181/255 |
| 5,887,424 | A | * | 3/1999 | Kuroshita | 60/293 |
| 5,984,045 | A | * | 11/1999 | Maeda et al. | 181/254 |
| 6,250,075 | B1 | * | 6/2001 | Funakoshi et al. | 60/299 |
| 6,394,225 | B1 | * | 5/2002 | Yasuda | 181/256 |

FOREIGN PATENT DOCUMENTS

| | | |
|---|---|---|
| JP | 05-332129 | 12/1993 |
| JP | 06-101464 | 4/1994 |
| JP | 10-311214 | 11/1998 |
| JP | 2001-115831 | 4/2001 |
| JP | 2003-184543 | 7/2003 |

OTHER PUBLICATIONS

Official communication issued in the counterpart European Application No. EP 06 01 0862, completed on Oct. 17, 2006.

* cited by examiner

*Primary Examiner*—Thomas Denion
*Assistant Examiner*—Diem Tran
(74) *Attorney, Agent, or Firm*—Keating & Bennett, LLP

(57) ABSTRACT

An exhaust system for a vehicle includes a muffler including end walls and a side wall connected to the end walls enclosing an interior space of the muffler. A first pipe is disposed within the interior space of the muffler and extends from one end of the muffler at which exhaust gas enters the muffler. A catalyst is located in the first pipe and at least one additional pipe is disposed within the interior space such that a longitudinal axis of the at least one additional pipe is spaced from a longitudinal axis of the first pipe in a direction that is substantially perpendicular to the longitudinal axis of the first pipe. The first pipe includes a plurality of holes disposed in a sidewall thereof at an upstream side of the catalyst in a direction in which exhaust gas passes through the muffler. The holes in the first pipe are arranged such that some of the exhaust gas passes through the catalyst and the remainder of the exhaust gas passes through the plurality of holes so as to bypass the catalyst.

22 Claims, 2 Drawing Sheets

LAYOUT OF CATALYST OF VEHICLE

BACKGROUND OF THE INVENTION

1. Field of the Invention

The present invention relates to an exhaust system for a vehicle such as an All-Terrain Vehicle (ATV), Side-by-Side Vehicle (SSV) or other off-road vehicle, for example. More particularly, the present invention relates to a catalyst installed in a muffler of an exhaust system for a vehicle such as an ATV, SSV or other off-road vehicle.

2. Description of the Related Art

ATVs, SSVs and other off-road vehicles are commonly used on a variety of harsh terrain including sand, dirt, and in shallow water. These vehicles are powered by internal combustion engines including exhaust systems that include a muffler and a catalyst for cleaning the exhaust gas before the exhaust gas is expelled into the environment.

In conventional exhaust systems including catalysts (e.g., catalytic converters), the catalyst causes resistance that blocks the flow of exhaust gas through the exhaust system. This resistance causes a substantial deterioration in performance of the vehicle.

To overcome this problem, the sizes of conventional catalysts have been increased to reduce the resistance caused thereby. However, this increase in size disadvantageously increases the size and cost of the catalyst, and the overall size and cost of the exhaust system.

A conventional exhaust system including a catalyst is disclosed in Japanese Unexamined Patent Application Publication No. 2001-115831. As seen in FIG. 1 of JP 2001-115831, the catalyst unit 3 is spaced from a pipe 1 and is supported by only a single support 6 in a cantilevered manner. Due to the single support 6, the catalyst unit 3 is susceptible to failure. Particularly, the shock caused by the off-road vehicle traversing rough and uneven terrain causes the catalyst unit 3 to separate from the single support 6, thus, causing failure.

In addition, since the catalyst unit 3 is spaced from the pipe 1 and is a separate unit from the pipe 1, the exhaust system of JP 2001-115831 is difficult to assemble, and it is difficult to accurately align the pipe 1 and the catalyst unit 3 such that the desired amount of exhaust gas passes from the pipe 1 through the catalyst unit 3. Thus, with the exhaust system of JP 2001-115831, it is difficult to assemble the muffler and catalyst unit, difficult to securely hold the catalyst unit in position, and difficult to control a precise amount of exhaust gas produced.

Another conventional exhaust system including a catalyst is disclosed in Japanese Unexamined Patent Application Publication No. 10-311214. As seen in FIGS. 2 and 6-9 of JP 10-311214, a catalyst 15 is provided in a forward portion of an expanded pipe 13 of an exhaust system and is spaced from the pipe 11. The catalyst 15 is supported by supports 16 and 17. In addition, a second catalytic converter 21 is provided in a rear portion of the expanded pipe 13 which is supported by supports 24 and 25 having openings.

Similar to JP 2001-115831, since the catalyst 15 of JP 10-311214 is spaced from the pipe 11 and is a separate unit, the exhaust system of JP 10-311214 is difficult to assemble, and it is difficult to accurately align the pipe 11 and the catalyst 15 such that the desired amount of exhaust gas passes through the catalyst 15. Thus, with the exhaust system of JP 10-311214, it is difficult to assemble the muffler and catalyst unit and difficult to control a precise amount of exhaust gas produced.

SUMMARY OF THE INVENTION

To overcome the problems described above, preferred embodiments of the present invention provide a vehicle exhaust system including a catalyst that is easy to assemble, securely held in position, does not cause an increase in the size of the vehicle exhaust system or vehicle, and enables a precise amount of exhaust gas to be emitted from the exhaust system.

According to a preferred embodiment, an exhaust system for a vehicle includes a muffler, at least one sidewall enclosing an interior space of the muffler, a first pipe disposed within the interior space of the muffler and extending from one end of the muffler at which exhaust gas enters the muffler, a catalyst located in the first pipe, at least one additional pipe disposed within the interior space such that a longitudinal axis of the at least one additional pipe is spaced from a longitudinal axis of the first pipe in a direction that is substantially perpendicular to the longitudinal axis of the first pipe, wherein the first pipe includes a plurality of holes disposed in a sidewall thereof at an upstream side of the catalyst in a direction in which exhaust gas passes through the muffler, such that some of the exhaust gas passes through the catalyst and the remainder of the exhaust gas passes through the plurality of holes so as to bypass the catalyst.

A first wall and a second wall are preferably located in the muffler and arranged such that the first wall supports a first end portion of the first pipe and the second wall supports a second end portion of the first pipe and an end portion of the at least one additional pipe. The second wall may preferably include at least one opening for allowing exhaust gas that passes through the catalyst to pass through the at least one additional pipe.

The first pipe and the at least one additional pipe extend through openings in the second wall and are secured in the openings. Also, it is preferred that the at least one opening in the second wall includes two openings that are disposed at upper right and lower left quadrants of the second wall. Further, it is preferred that the opening through which the first pipe extends is disposed in an upper left quadrant of the second wall and the opening through which the at least one additional pipe extends is disposed in a lower right quadrant of the second wall.

The at least one additional pipe includes a second pipe and a third pipe. The second pipe is preferably disposed in a central portion of the muffler and the third pipe is disposed at a downstream end of the muffler so as to discharge exhaust gas therefrom.

The plurality of holes in the first pipe are preferably arranged in at least two substantially parallel rows and the holes arranged in one of the at least two substantially parallel rows are preferably offset from the holes arranged in the other of the at least two substantially parallel rows.

As a result of this unique construction, the catalyst is easily and accurately aligned with the first pipe or intake pipe of the exhaust system and is reliably and securely held in place without any possibility that the catalyst could be dislodged from its desired position. Thus, the exhaust system including the catalyst is easy to assemble, securely held in position, and does not cause an increase in the size of the vehicle exhaust system or vehicle. Also, the unique arrangement of the holes in the catalyst enables a precise amount of exhaust gas to be emitted from the exhaust system.

According to another preferred embodiment of the present invention, a vehicle is provided and includes an exhaust system, a muffler and a catalyst having the arrangement and characteristics described above.

These and other features, elements, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
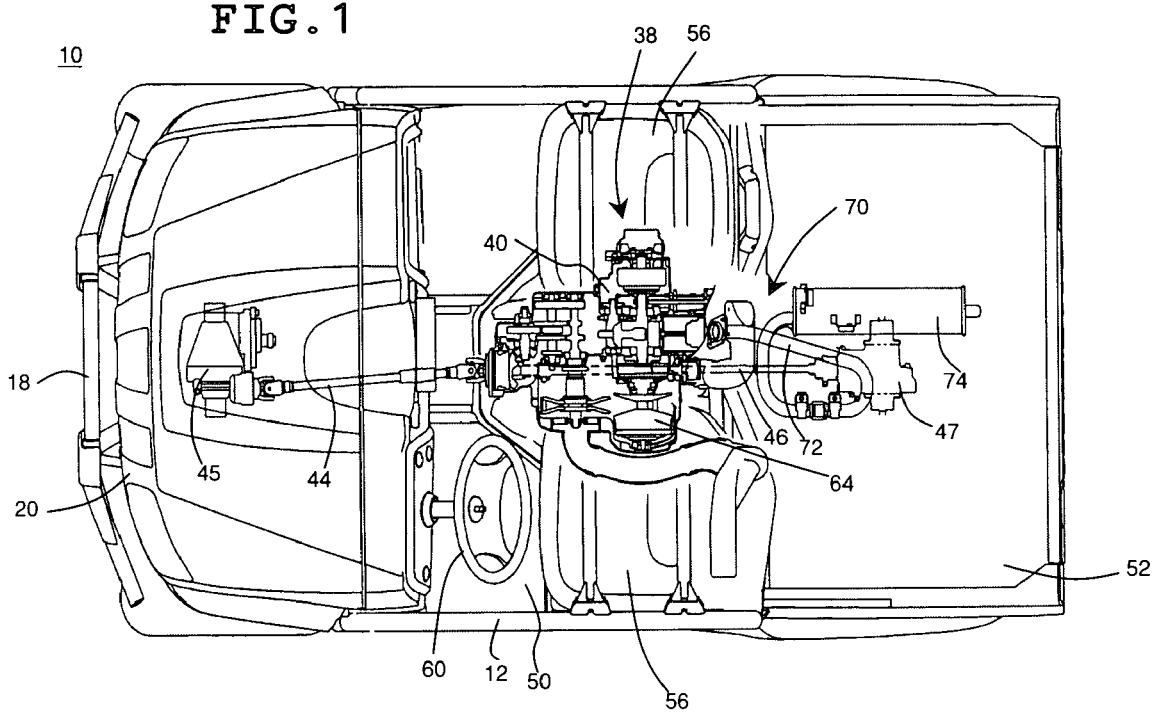
FIG. 1 is a top plan view of a vehicle having an exhaust system including a muffler and catalyst according to a preferred embodiment of the present invention.
Figure 2:
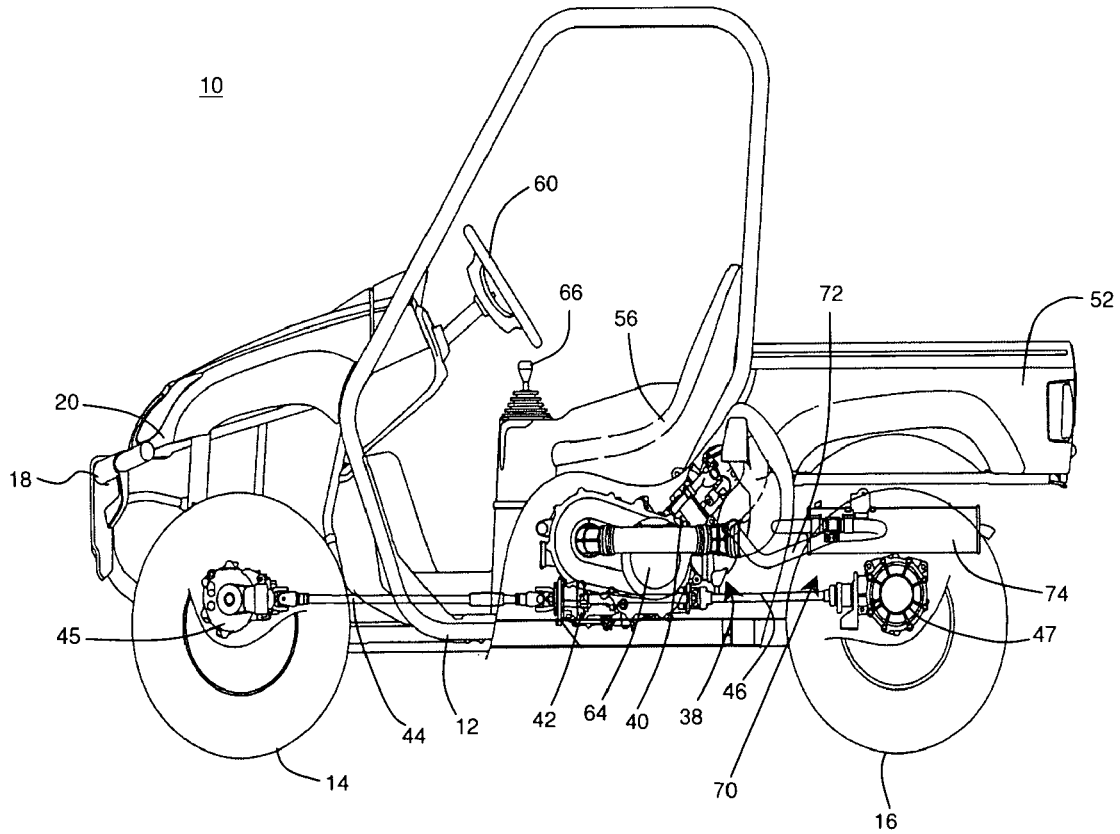
FIG. 2 is a side view of the vehicle of FIG. 1.

With reference to FIGS. 1 and 2, an off-road or all terrain vehicle, which is generally indicated by the reference numeral 10, will be described. The vehicle 10 is preferably arranged and configured in accordance with a preferred embodiment of the present invention. More particularly, the vehicle 10 preferably includes an exhaust system, which will be described below, that is arranged and configured in accordance with one of the preferred embodiments of the present invention.

While the present invention will be described in the context of the illustrated vehicle 10, it should be understood that the present invention may also be applied to various types of vehicles. For instance, although the illustrated vehicle 10 includes four wheels, the present invention could be used on motor vehicles having two wheels, three wheels or more than four wheels. In addition, the present invention may also be used in vehicles having runners and tracks or other drive arrangements. Furthermore, although the illustrated vehicle 10 includes two seats, the present invention may be used on motor vehicles having one seat, or three or more seats.

The illustrated vehicle 10 includes a frame assembly 12 that is supported by a plurality of wheels. In the illustrated arrangement, the frame assembly 12 is preferably supported by a pair of front wheels 14 and a pair of rear wheels 16. Alternatively, the vehicle 10 could be supported by a single front wheel and a pair of rear wheels, a pair of front wheels and single rear wheel, or any number of front or rear wheels. Furthermore, as discussed above, the present invention can also be used with vehicles that utilize driving track arrangements and forward runners, for example, instead of wheels.

The frame assembly 12 is preferably a welded type of frame assembly, as is known to those of ordinary skill in the art. However, any suitable type of frame assembly may be used. While not illustrated, the presently preferred type of frame includes a left side assembly and right side assembly. The left side assembly and the right side assembly are interconnected with crossing members. Because these assemblies are well known to those of ordinary skill in the art, further description of the frame assembly 12 is deemed unnecessary to understand the present invention.

A forward portion of the illustrated frame assembly 12 includes a front bumper 18. With reference to FIGS. 1 and 2, the front bumper 18 preferably extends upwardly and forwardly of a lower portion of the illustrated frame assembly 12. In this manner, the front bumper 18 wraps around a forward portion of a front fender assembly 20. The front bumper 18 may be integrally formed with the frame assembly 12 or may be a separate add-on component, as will be recognized by those of ordinary skill in the art.

The illustrated front wheels 14 are rotatably supported by a conventional front suspension system (not shown). Because the front suspension system is well known to those of ordinary skill in the art, further description of the arrangement is deemed unnecessary.

The rear wheels 16 preferably rotate about a common axle and a rear suspension system (not shown). However, independently suspended rear wheels also may be used. Because the rear suspension system is well known to those of ordinary skill in the art, further description of the arrangement is deemed unnecessary.

The illustrated frame assembly 12 provides a platform upon which a variety of other components are mounted. For instance, the hollow central portion of the illustrated frame assembly 12 defines an engine compartment 38. The engine compartment 38 is defined between the left portion and the right portion of the frame assembly 12 and is disposed between the front wheels 14 and the rear wheels 16. This location provides a low center of gravity for the vehicle by mounting a centrally located engine 40 within the engine compartment 38. The engine 40 may have any suitable construction and may be arranged either transversely or longitudinally within the engine compartment 38. In other words, a crankshaft (not shown) of the engine 40 may extend transverse to the direction of travel of the vehicle 10 or may extend along the same direction of travel of the vehicle.

A transfer case 42 is provided at a lower portion of the engine 40. A front drive shaft 44 extends between the transfer case 42 and a front differential gear box 45 to drive the front wheels 14. A rear drive shaft 46 extends between the transfer case 42 and a rear differential gear box 47 to drive the rear wheels 16. In the present preferred embodiment, the transfer case 42 can be set to drive only the rear wheels 16 or drive both the front wheels 14 and the rear wheels 16. However, other arrangements are within the scope of the present invention. For example, only a front drive shaft and a front differential gear box may be provided, or only a rear drive shaft and a rear differential gear box may be provided. Because the structure of the transfer case 42, the front drive shaft 44, the front differential gear box 45, the rear drive shaft 46 and the rear differential gear box 47 are well known to those of ordinary skill in the art, further description of the arrangement is deemed unnecessary.

In some applications, side panels (not shown) may be provided to at least partially enclose the engine compartment 38. The side panels preferably extend downward from a portion of the seats 56 toward an exterior surface of the engine 40 and an associated transmission 64.

A front fender assembly 20 is preferably disposed above the front wheels 14. The front fender assembly 20 may include a single component or multiple components and preferably extends around the front portion of the vehicle 10. The front fender assembly 20 is preferably made from a moldable resin material or a lightweight sheet metal and is preferably mounted to the frame assembly in any suitable manner. The illustrated arrangement preferably uses threaded fasteners to removably attach the front fender assembly 20 to the frame assembly 12.

In the illustrated arrangement, a carrier bed 52 is preferably mounted to a rear portion of the frame assembly 12. Preferably, the carrier bed 52 is connected to the rear portion of the frame assembly 12 using threaded fasteners, or other mechanical fasteners, that can be removed from the top of the vehicle. The use of top mounted fasteners advantageously enables easy removal of the carrier bed 52 for maintenance.

Two seats 56 are preferably disposed above the engine 40. The seats 56 are arranged side-by-side to as to accommodate a driver and a passenger. Of course, only a single seat 56 may be provided, or the seat(s) 56 may be arranged in any other suitable configuration.

With continued reference to FIGS. 1 and 2, a fuel tank (not shown) is preferably disposed below the seats 56. The fuel tank is mounted in any suitable manner and can be made from any suitable material. Preferably, the fuel tank is made of molded resin materials; however, the fuel tank may also be made of a lightweight metal material.

A steering wheel assembly 60 is coupled to the front wheels 14 through a suitable steering arrangement, which is not shown.

The vehicle 10 also preferably includes a gear shifting arrangement. The gear shifting arrangement is preferably controlled by a gear shift lever 66. The gear shift lever 66 may be located anywhere proximate the operator of the vehicle 10 such that the gear shift lever 66 can be easily actuated by the operator. In the preferred embodiment of the present invention, the gear shift lever is located between the seats 56. In some arrangements, the gear shift lever 66 operates a shifting mechanism for use when the vehicle is on the fly and in other arrangements the gear shift lever 66 is used to control the gear shifting while the vehicle is at a standstill. An actuator relay assembly, which is not shown, generally transfers movement of the gear shift lever 66 to a shift drum positioned within a transmission 64 in the illustrated arrangement.

The illustrated vehicle 10 also preferably includes a foot brake actuator (not shown) and an accelerator actuator (not shown). The foot brake actuator is pivotably attached to the frame assembly 12 through a suitable mounting bracket. When the foot brake actuator is depressed by the foot of an operator, the brakes are applied so as to slow the vehicle to a stop. In some arrangements, the foot brake actuator may operate a parking brake or may actuate all or fewer than all of the brakes associated with the wheels 14,16. Preferably, the foot brake actuator extends upwardly through a hole defined within the footboard 50. In this arrangement, the majority of the foot brake actuator is disposed below the footboard 50 and out of the leg area of the vehicle 10.

As shown in FIGS. 1 and 2, the vehicle 10 also includes an exhaust system 70 for discharging exhaust gases produced in the engine 40 during combustion. The exhaust system includes an exhaust pipe 72 which extends from the engine 40 to the muffler 74. The exhaust pipe 72 may be configured in any suitable shape so as to effectively utilize the space between the engine 40 and the muffler 74. In the present preferred embodiment, the exhaust pipe 72 is configured so as to extend in a loop, but the exhaust pipe 72 may have any configuration or arrangement.

Figure 3:
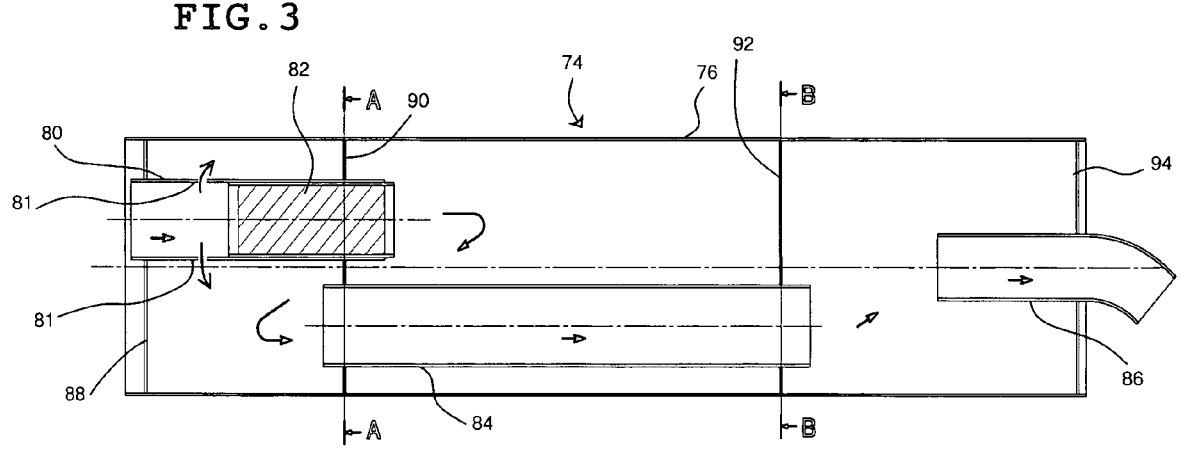
FIG. 3 is a side view of the muffler and catalyst according to a preferred embodiment of the present invention.
Figure 6:
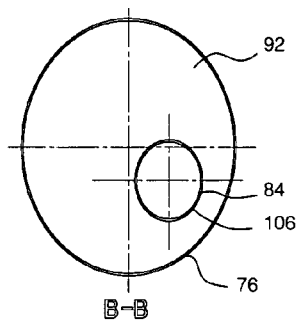
FIG. 6 is a cross-sectional view taken along line B-B in FIG. 3.

As shown in FIGS. 3 and 6, the muffler 74 preferably has a substantially cylindrically shaped sidewall 76. However, the sidewall 76 of the muffler 74 may have any suitable shape. First, second and third pipes 80, 84 and 86 are disposed, at least partially, inside the muffler 74. The first pipe 80 is supported at opposite ends portions thereof by a first wall 88 and a second wall 90. A catalyst 82 is disposed within the first pipe 80 towards a downstream side thereof. Thus, the catalyst 82 is reliably and securely held by the first and second walls 88 and 90, and is accurately aligned with the first pipe 80.

The second pipe 84 is supported at ends portions thereof by the second wall 90 and a third wall 92. The third pipe 86 is supported in a central portion thereof by a fourth wall 94. The first and fourth walls 88 and 94 define end walls of the muffler 74.

Figure 4:
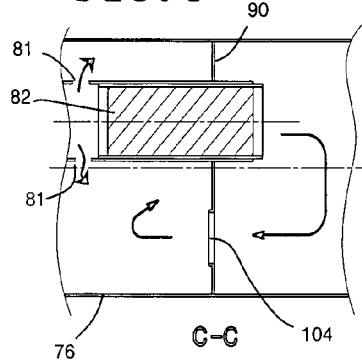
FIG. 4 is a partial side view of the catalyst according to a preferred embodiment of the present invention.
Figure 5:
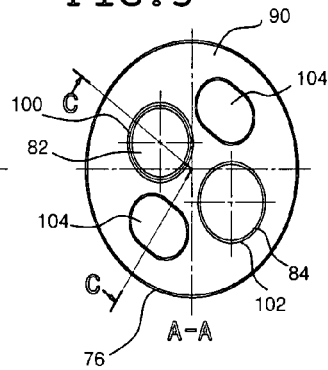
FIG. 5 is a cross-sectional view taken along line A-A in FIG. 3.

As seen in FIGS. 4 and 5, the first pipe 80 extends through an opening 100 in the second wall 90, and is secured therein. The second pipe 84 extends through an opening 102 in the second wall 90, and is secured therein. Any suitable method of securing the first and second pipes 80 and 84 in the openings 100 and 102, such as welding, may be used. The second wall 90 further includes openings 104 through which the exhaust gas flows from the first pipe 80 to the second pipe 84. In the present preferred embodiment of the present invention, two openings 104 are preferably provided. However, a single opening or three or more openings may be provided.

As shown in FIG. 5, the opening 100 is preferably located in the upper left quadrant of the second wall 90, the opening 102 is preferably located in the lower right quadrant of the second wall 90, and the openings 104 are preferably provided in the upper right and lower left quadrants of the second wall 90. However, any suitable arrangement of the openings 100, 102 and 104 may be used.

As shown in FIGS. 3 and 4, holes 81 are preferably provided in the sidewall of the first pipe 80. The holes 81 are provided on the upstream side of the catalyst 82 to allow some of the exhaust gas to bypass the catalyst 82, as illustrated by the arrows shown in FIGS. 3 and 4. A plurality of relatively small holes 81 are provided in the sidewall of the first pipe 80 so as to maintain the durability of the first pipe 80. If a single large hole was provided in the first pipe 80, the strength and durability of the first pipe 80 would be substantially reduced.

Figure 7:
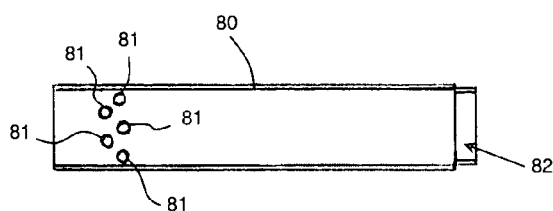
FIG. 7 is a side view of the first pipe showing the arrangement of holes disposed therein.

As shown in FIG. 7, the plurality of holes 81 are preferably disposed in two substantially parallel lines around the circumference of the side wall of the first pipe 80, and the holes 81 aligned along one of the lines are offset from the holes 81 aligned along the other line, such that the lines of holes 81 may be disposed closer together. However, any other suitable arrangement of the plurality of holes may be used. The holes 81 are preferably disposed at a front portion of the first pipe 80. However, the holes 81 may be disposed anywhere along the first pipe 80 that is upstream of the catalyst 82. The holes 81 enable a precise amount of exhaust gas to be emitted from the exhaust system and prevent the problems with the catalyst causing resistance to air or water flowing through the muffler 74. Thus, proper performance of the exhaust system is achieved without any increase in size of the muffler or vehicle.

The holes 81 are preferably formed in the sidewall of the first pipe 80 by punching so as to facilitate the production of the muffler. However, any other suitable method of forming the holes 81 may be used. The shape of the holes 81 is not limited to any specific shape, and any suitable shape may be used.

As shown in FIG. 6, the second pipe 84 extends through an opening 106 in the third wall 92, and is secured therein. Any suitable method of securing the second pipe 84 in the opening 104, such as welding, may be used. Unlike the second wall 90, the third wall 92 does not include any additional openings therein. Thus, all of the exhaust gas passes through the second pipe 84, and is discharged through the third pipe, as shown by the arrows in FIG. 3.

With the unique construction of the preferred embodiments described above, the catalyst is easily and accurately aligned with the intake pipe of the exhaust system and is reliably and securely held in place without any possibility that the catalyst could be dislodged from its desired position. Thus, the exhaust system including a catalyst is easy to assemble, securely held in position, and does not cause an increase in the size of the vehicle exhaust system or vehicle. Also, the unique arrangement of the holes in the catalyst enables a precise amount of exhaust gas to be emitted from the exhaust system.

While the present invention has been described with respect to the preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. An exhaust system for a vehicle comprising:
   a muffler;
   at least one sidewall enclosing an interior space of the muffler;
   a first pipe disposed within the interior space of the muffler and extending from one end of the muffler at which exhaust gas enters the muffler;
   a catalyst located in the first pipe; and
   at least one additional pipe disposed within the interior space such that a longitudinal axis of the at least one additional pipe is spaced from a longitudinal axis of the first pipe in a direction that is substantially perpendicular to the longitudinal axis of the first pipe; wherein
   an outer peripheral surface of the at least one additional pipe does not include holes; and
   said first pipe includes a plurality of holes disposed in a sidewall thereof at an upstream side of the catalyst in a direction in which exhaust gas passes through the muffler, such that some of the exhaust gas passes through the catalyst and the remainder of the exhaust gas passes through the plurality of holes so as to bypass the catalyst.

2. The exhaust system according to claim 1, further comprising a first wall and a second wall located in the muffler, wherein the first wall supports a first end portion of the first pipe and the second wall supports a second end portion of the first pipe and an end portion of the at least one additional pipe.

3. The exhaust system according to claim 2, wherein the second wall includes at least one opening for allowing exhaust gas that passes through the catalyst to pass through the at least one additional pipe.

4. The exhaust system according to claim 2, wherein the first pipe and the at least one additional pipe extend through openings in the second wall and are secured in the openings.

5. The exhaust system according to claim 3, wherein the at least one opening in the second wall includes two openings that are disposed at upper right and lower left quadrants of the second wall.

6. The exhaust system according to claim 5, wherein the opening through which the first pipe extends is disposed in an upper left quadrant of the second wall and the opening through which the at least one additional pipe extends is disposed in a lower right quadrant of the second wall.

7. The exhaust system according to claim 1, wherein the at least one additional pipe includes a second pipe and a third pipe.

8. The muffler according to claim 7, wherein the second pipe is disposed in a central portion of the muffler and the third pipe is disposed at a downstream end of the muffler so as to discharge exhaust gas therefrom.

9. The muffler according to claim 1, wherein the plurality of holes are arranged in at least two substantially parallel rows.

10. The muffler according to claim 9, wherein the holes arranged in one of the at least two substantially parallel rows are offset from the holes arranged in the other of the at least two substantially parallel rows.

11. A vehicle comprising:
    a frame assembly;
    an exhaust system mounted on a portion of the frame assembly and including:
      a muffler;
      at least one sidewall enclosing an interior space of the muffler;
      a first pipe located within the interior space of the muffler and extending from one end of the muffler at which exhaust gas enters the muffler;
      a catalyst located in the first pipe; and
      at least one additional pipe disposed within the interior space so as to be spaced from a longitudinal axis of the first pipe in a direction that is substantially perpendicular to the longitudinal axis of the first pipe; wherein
      said first pipe includes a plurality of holes disposed in a sidewall thereof at an upstream side of the catalyst in a direction in which exhaust gas passes through the muffler, such that some of the exhaust gas passes through the catalyst and the remainder of the exhaust gas passes through the plurality of holes so as to bypass the catalyst;
      the at least one additional pipe includes a second pipe that some of the exhaust gas passes through next after passing through the catalyst and that the remainder of the exhaust gas passes through as well, and a third pipe spaced from the second pipe; and
      an outer peripheral surface of the second pipe does not include holes.

12. The vehicle according to claim 11, wherein the second pipe is disposed in a central portion of the muffler and the third pipe is disposed at a downstream end of the muffler so as to discharge exhaust gas therefrom.

13. The vehicle according to claim 11, wherein the third pipe is spaced in a longitudinal direction from the second pipe.

14. The vehicle according to claim 11, wherein the third pipe is spaced in a lateral direction from the second pipe.

15. The vehicle according to claim 11, wherein the third pipe is axially offset from the second pipe.

16. The vehicle according to claim 11, further comprising a first wall and a second wall located in the muffler, wherein the first wall supports a first end portion of the first pipe and the second wall supports a second end portion of the first pipe and an end portion of the second pipe.

17. The vehicle according to claim 16, wherein the second wall includes at least one opening for allowing exhaust gas that passes through the catalyst to pass through the second pipe.

18. The vehicle according to claim 16, wherein the first pipe and the second pipe extend through openings in the second wall and are secured in the openings.

19. The vehicle according to claim 17, wherein the at least one opening in the second wall includes two openings that are disposed at upper right and lower left quadrants of the second wall.

20. The vehicle according to claim 18, wherein the opening through which the first pipe extends is disposed in an upper left quadrant of the second wall and the opening through which the second pipe extends is disposed in a lower right quadrant of the second wall.

21. The vehicle according to claim 11, wherein the plurality of holes are arranged in at least two substantially parallel rows.

22. The vehicle according to claim 21, wherein the holes arranged in one of the at least two substantially parallel rows are offset from the holes arranged in the other of the at least two substantially parallel rows.

* * * * *